(12) United States Patent
Masuta et al.

(10) Patent No.: US 7,198,026 B2
(45) Date of Patent: Apr. 3, 2007

(54) DIVIDER PLATE FOR AN INLET PORT, SAND CORE FOR FORMING AN INLET PORT, AND CYLINDER HEAD

(75) Inventors: Tatsuya Masuta, Kanagawa (JP); Hirohito Kajihara, Kanagawa (JP); Hiroshi Katou, Tokyo (JP); Kenji Yageta, Shimotsuke (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/405,898

(22) Filed: Apr. 18, 2006

(65) Prior Publication Data

US 2006/0231067 A1    Oct. 19, 2006

(30) Foreign Application Priority Data

Apr. 19, 2005   (JP)   .............................. 2005-121516

(51) Int. Cl.
*F02B 31/04* (2006.01)
*F02B 31/00* (2006.01)

(52) U.S. Cl. ........................ 123/308; 123/432; 123/302

(58) Field of Classification Search ................ 123/306, 123/188.14, 308, 432, 302
See application file for complete search history.

(56) References Cited

U.S. PATENT DOCUMENTS

| | | | |
|---|---|---|---|
| 6,877,478 B2 * | 4/2005 | Kim et al. ................... | 123/306 |
| 7,032,560 B2 * | 4/2006 | Katou et al. .............. | 123/193.5 |
| 2002/0078921 A1 | 6/2002 | Kim et al. | |
| 2004/0118379 A1 * | 6/2004 | Harui ......................... | 123/432 |
| 2004/0211390 A1 * | 10/2004 | Kim et al. ................... | 123/308 |
| 2005/0081821 A1 * | 4/2005 | Katou et al. ................ | 123/308 |
| 2005/0081822 A1 * | 4/2005 | Yageta et al. ............... | 123/308 |
| 2005/0082028 A1 * | 4/2005 | Akaba ......................... | 164/98 |

FOREIGN PATENT DOCUMENTS

| | | |
|---|---|---|
| DE | 19803867 A1 | 8/1999 |
| EP | 1525934 A | 4/2005 |
| JP | 2002-501829 | 11/1998 |
| JP | 2002201948 | 7/2002 |
| JP | 2004060461 A | 2/2004 |
| WO | WO-99/38629 A1 | 11/1998 |

OTHER PUBLICATIONS

English Abstract of JP-2002201948.

* cited by examiner

*Primary Examiner*—Mahmoud Gimie
(74) *Attorney, Agent, or Firm*—Rader, Fishman & Grauer PLLC

(57) ABSTRACT

A divider plate for two or more inlet ports provided in a cylinder head of an internal-combustion engine comprises divider portions that divides inside of the two or more inlet ports along an intake air flow, a side cast-in insert portion provided on at least one side portion located in a direction perpendicular to that of the intake air flow, that is enclosed by molten metal during casting of the cylinder head, an inner cast-in insert portion that is provided between the divider portions, that is enclosed by the molten metal during the casting of the cylinder head, and an inner accelerator formed in the inner cast-in insert portion, accelerates coagulation of the molten metal, wherein the inner accelerator has at least one of a plurality of holes, a concave portion, a convex portion, and a concave-convex portion, or a combination of a hole and a concave portion, a convex portion or a concave-convex portion.

18 Claims, 8 Drawing Sheets

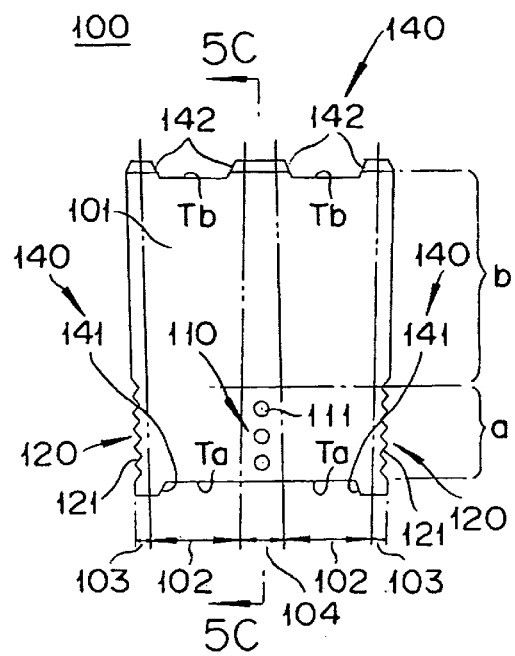
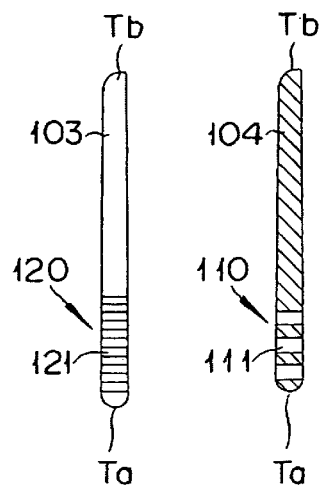
FIG. 5A
FIG. 5B  FIG. 5C
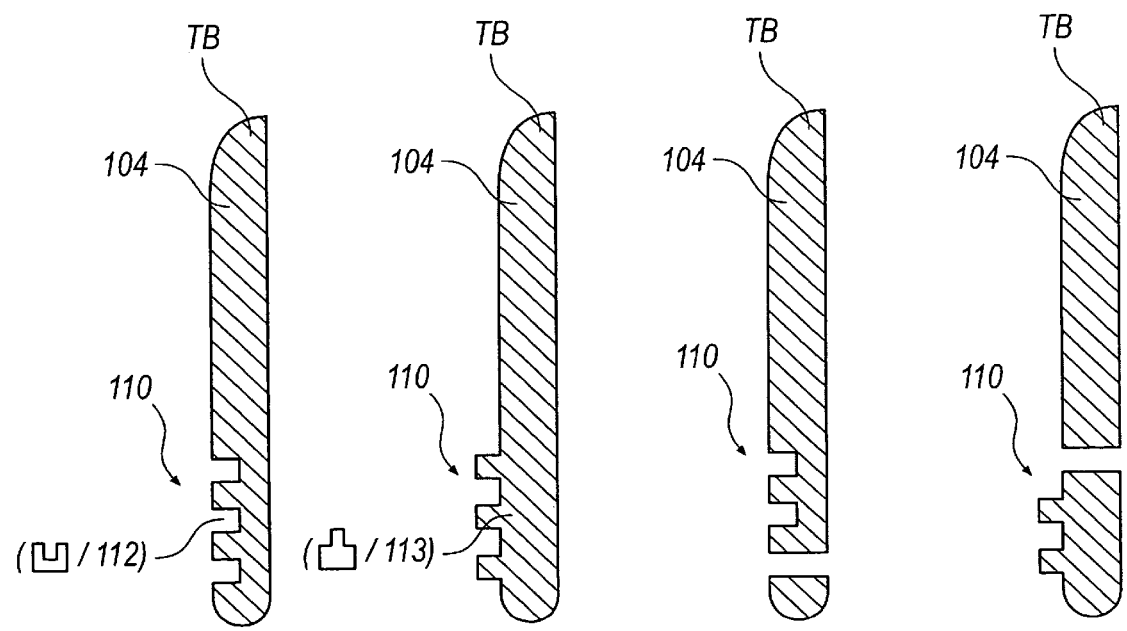
FIG. 5D  FIG. 5E  FIG. 5F  FIG. 5G

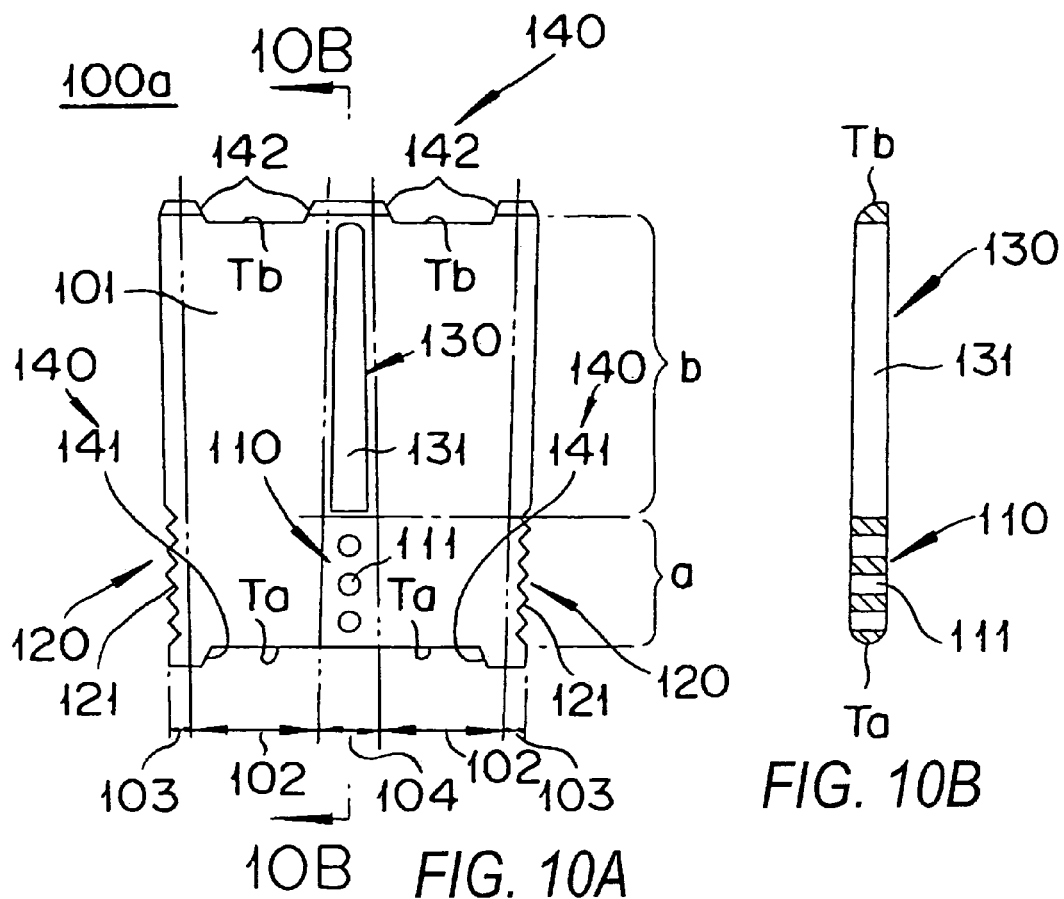
FIG. 10A
FIG. 10B
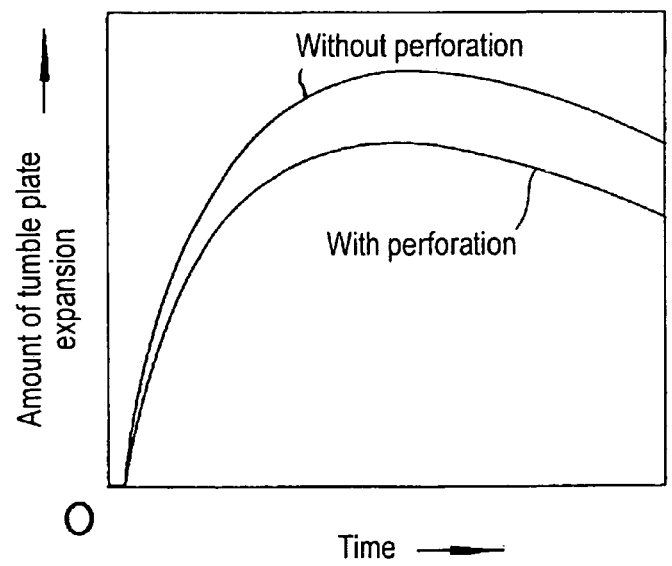
Changes in the length of the tumble plate during the casting process
FIG. 10C

DIVIDER PLATE FOR AN INLET PORT, SAND CORE FOR FORMING AN INLET PORT, AND CYLINDER HEAD

RELATED APPLICATION

The disclosure of Japanese Patent Application No. 2005-121516, filed Apr. 19, 2005, including the specification, claims and drawings, is incorporated herein by reference in its entirety.

FIELD

Described herein is a divider plate for an inlet port, a sand core for forming the inlet port, and a cylinder head.

BACKGROUND

Some recent internal combustion engines have a cylinder head provided with a divided port mechanism. Such a cylinder head has inlet ports divided into top and bottom portions by a divider plate that may also be called a "tumble plate." By controlling an intake air flow control valve that is positioned at the inlet side edge of the inlet port, the intake air that is introduced from the inlet port to a cylinder bore is deflected thereby intensifying a tumble flow (vertical eddy flow) that is generated in the cylinder bore, so that the gas mileage, etc., is improved (See Japanese Laid Open Patent No. 2001-193469).

SUMMARY

In the present specification, the upstream side of a divider plate, where the intake air or fuel gas flows in, is called the "inlet side" and the downstream side thereof, namely the cylinder bore side is called the "cylinder side".

When casting a cylinder head, in general, a divider plate, which is made of metal, is placed in a sand core for forming inlet ports, and a cast-in insert of the divider plate is carried out. During casting of a cylinder head, both the sand core for forming the inlet ports and the divider plate experience thermal expansion due to temperature raised by heat from the molten metal used in the casting operation. The thermal expansion coefficient of the divider plate is largely different from that of the sand core. That is, the amount of thermal expansion of the divider plate is larger than that of the sand core. Therefore, the divider plate presses or pushes and opens the sand core. In addition, due to thermal expansion of the divider plate, the position of the divider plate sometimes shifts during casting of the cylinder head.

Therefore, depending on the location where a burr is generated from the casting operation, thermal expansion may cause a deterioration of the quality of the cylinder head due to misalignment of the divider plate and mis-fitting inside the cylinder head. Therefore, the thermal effect on the divider plate should be adequately taken into account.

The divider plate disclosed in Japanese Laid Open Patent No. 2001-193469 is formed in a wavy shape in order to prevent deformation due to thermal expansion at a cast-in insert of the divider plate during casting of the cylinder head. Although a wave-shaped divider plate can absorb the thermal expansion in the radius direction of the inlet port, thermal expansion in the axis direction cannot be absorbed. Therefore, due to the difference in the amount of thermal expansion between the divider plate and the core, undesirable shifting of the position and mis-fitting of the divider plate cannot be sufficiently suppressed.

Taking the above-mentioned conditions into consideration, the product quality of the present disclosed embodiments of a divider plate, sand core, and cylinder head is improved by sufficiently suppressing position shifting of the divider plate relative to the inlet port.

The embodiments set forth below includes elements of two or more divider portions that divide an interior of two or more inlet ports along an intake air flow; a side cast-in insert portion provided on at least one side portion of the divider plate located in a direction perpendicular to that of the intake air flow and which is enclosed by molten metal during casting of the cylinder head; an inner cast-in insert portion that is provided between adjacent divider portions and which is enclosed by the molten metal during the casting of the cylinder head; and an inner accelerator formed in the inner cast-in insert portion which accelerates coagulation of the molten metal, wherein the inner accelerator has at least one of a plurality of holes, a concave portion, a convex portion, and a concave-convex portion.

Accordingly, since coagulation of the molten metal that is near the portion where the accelerator is provided at the inner cast insert portion is accelerated compared to the coagulation of the molten metal close to other portions, the position of the divider plate relative to the inlet port can be controlled. Thus, position shifting of the divider plate and mis-fitting in the divider plate can be sufficiently suppressed, and consequently product quality can be improved.

BRIEF DESCRIPTION OF THE DRAWINGS

Other features and advantages of the present divider plate, sand core, and cylinder head will be apparent from the ensuing description, taken in conjunction with the accompanying drawings, in which:

FIG. 5A a plan view of a tumble plate according to a first embodiment;

FIG. 5B is a side view of the tumble plate of FIG. 5A;

FIG. 5C is a cross-sectional view of the tumble plate of FIG. 5A, taken along line 5C—5C of FIG. 5A;

FIG. 5D is a cross-sectional view of the tumble plate of FIG. 5A, taken along line 5C—5C of FIG. 5A;

FIG. 5E is a cross-sectional view of the tumble plate of FIG. 5A, taken along line 5C—5C of FIG. 5A;

FIG. 5F is a cross-sectional view of the tumble plate of FIG. 5A, taken along line 5C—5C of FIG. 5A;

FIG. 5G is a cross-sectional view of the tumble plate of FIG. 5A, taken along line 5C—5C of FIG. 5A;

FIG. 10A is a plan view of a tumble plate according to a second embodiment;

FIG. 10B is a cross-sectional view of the tumble plate of FIG. 10A taken along line 10B—10B of FIG. 10A;

FIG. 10C is a graph illustrating changes in the length of the tumble plate of FIG. 10A according to the second embodiment during the casting process.

DETAILED DESCRIPTION OF THE ILLUSTRATED EMBODIMENTS

While the claims are not limited to the illustrated embodiments, an appreciation of various aspects of the divider plate, sand core and cylinder head is best gained through a discussion of various examples thereof.

First Embodiment

First, a cylinder head 10 having a divider plate 100 for inlet ports 14 is described. In the description set forth below, the divider plate 100 for the inlet ports 14 is also called a "tumble plate 100."

Figure 1:
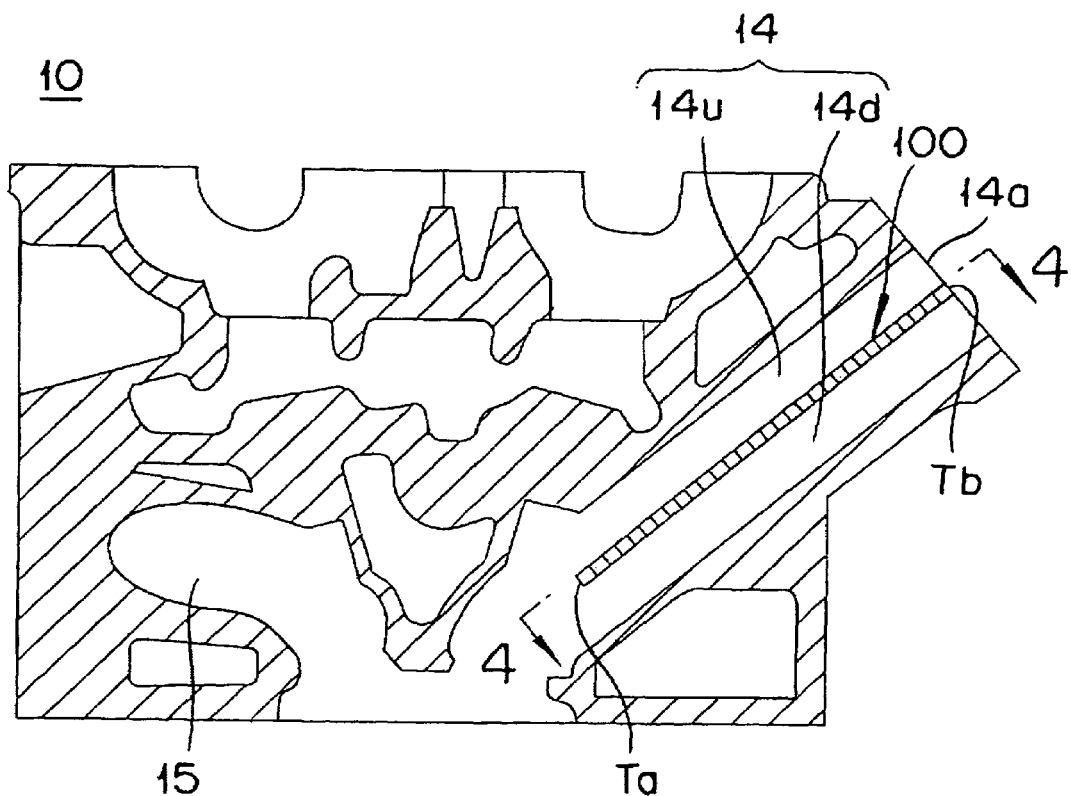
FIG. 1 is a schematic cross-sectional view of an embodiment of a cylinder head of an engine.
Figure 2:
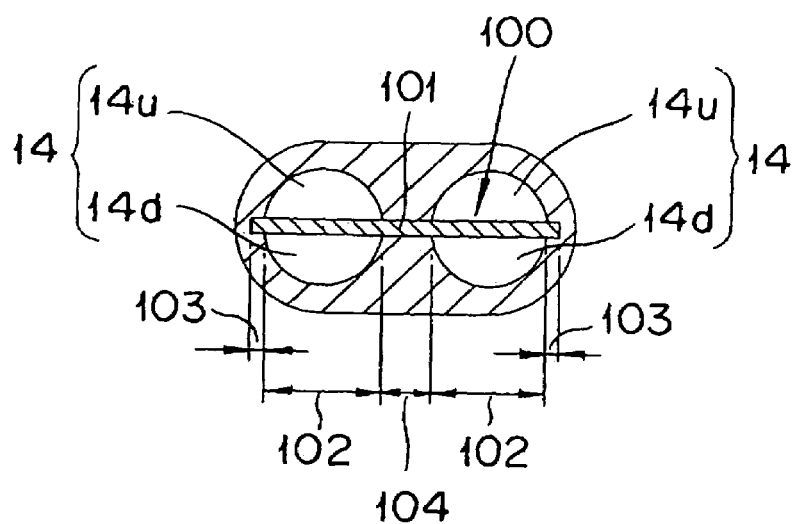
FIG. 2 is a schematic cross-sectional view taken in a direction perpendicular to an axis of an inlet port of the engine.
Figure 3:
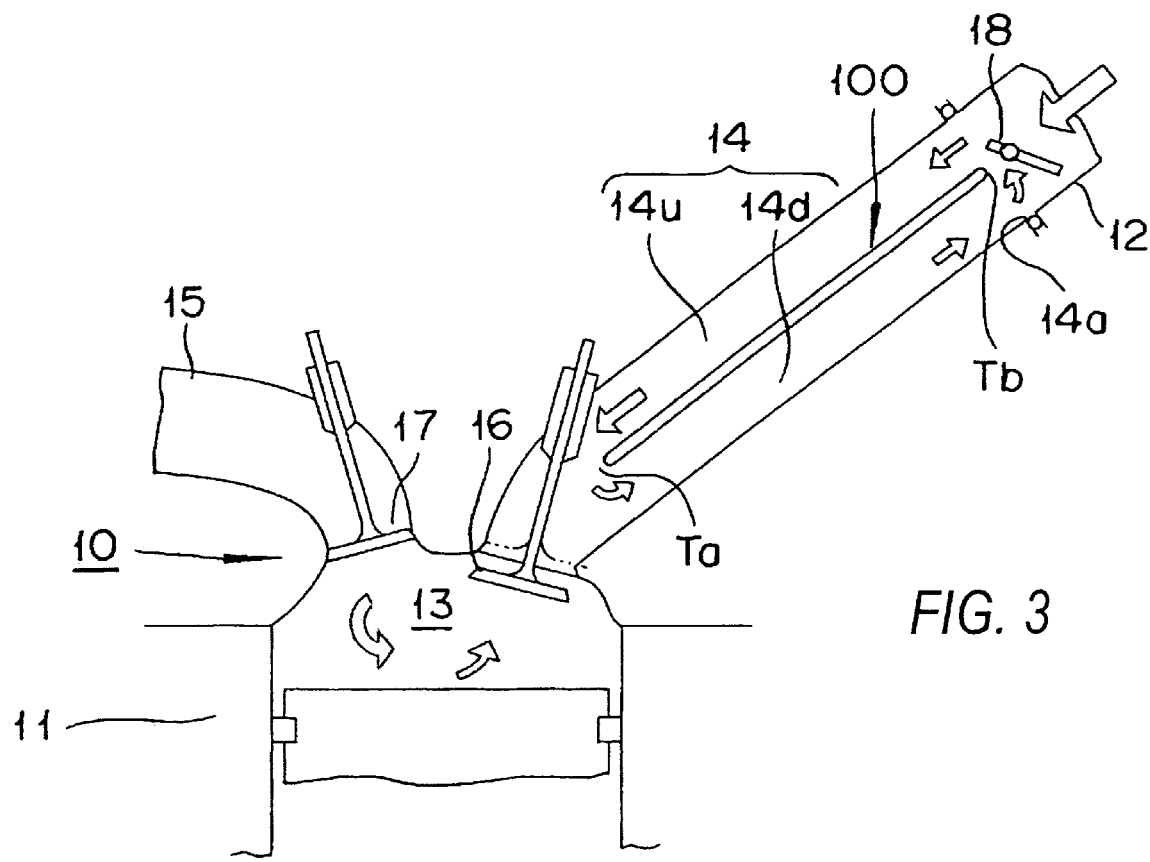
FIG. 3 is a schematic view showing air flow in the engine.
Figure 4:
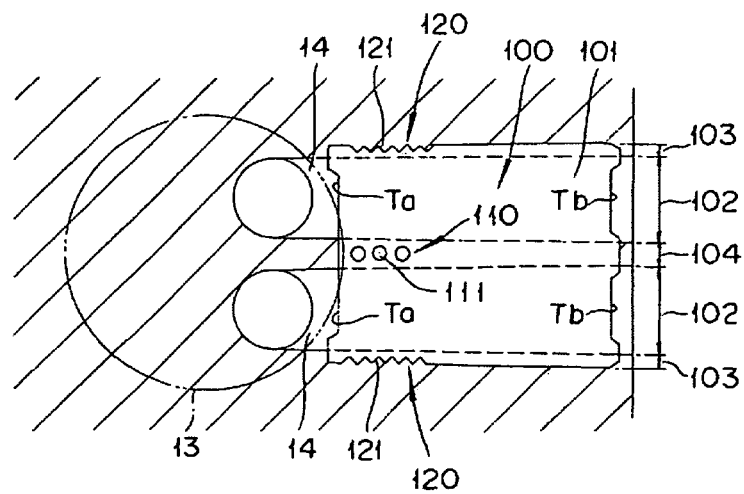
FIG. 4 is a schematic cross-sectional view taken along line 4—4 of FIG. 1.

FIG. 1 is a schematic cross-sectional view of the cylinder head of an engine. FIG. 2 is a schematic cross-sectional view taken in a direction perpendicular to the axis of the inlet port of the cylinder head. FIG. 3 is a schematic view showing air flow in the engine. FIG. 4 is a schematic cross-sectional view taken along the line 4—4 of FIG. 1.

Referring to FIGS. 1 to 4, the cylinder head 10 is provided on the top portion of a cylinder block 11 (FIG. 3). The cylinder head 10 has an inlet port 14 that introduces an intake air flow or fuel gas flow from an intake manifold 12 (FIG. 3) into a cylinder bore 13, and an exhaust port 15 that discharges an exhaust gas after combustion in the cylinder bore 13 is carried out. The inlet port 14 can be roughly classified as a Siamese type or divided type depending on the shape of path. In the Siamese type, the path is singular on the side of the intake manifold 12, and the path diverges into two directions in front of the combustion chamber. In the divided type, a single path shape is formed from the side of the intake manifold 12 to the combustion chamber. The engine shown in FIG. 4 has four valves per cylinder in which two inlet valves 16 and two exhaust valves 17 are provided thereon. In addition, the inlet port 14 is the divided type and two independent inlet ports 14 are provided on one cylinder.

This inlet port 14 is a so-called high port. The high-port-type inlet port 14 has a large gradient angle relative to the undersurface of the cylinder head 10, and an inlet side opening 14a opens to an upper portion of the outer wall of the cylinder head 10. The high-port-type inlet port 14 is employed in order to reduce the flow resistance of the intake air, or to avoid interference between an injector and inlet port 14, when the injector that directly injects fuel into the combustion chamber is arranged close to the inlet valve 16. In the direct inject type engine, an intake air flow flows in the inlet port 14.

In the inlet port 14, the tumble plate 100 is provided along the direction of the intake air that flows from an inlet side opening 14a to the cylinder side (outline arrows of FIG. 3). The tumble plate 100 is provided over two independent inlet ports 14 (See FIG. 4). The intake manifold 12 (FIG. 3) having a control valve 18 is provided on the inlet side of the tumble plate 100. Each of the inlet ports 14 is divided by the tumble plate 100 into an upper port 14u and a lower port 14d. When the lower port 14d is closed by the control valve 18, the intake air is accelerated and flows in the upper port 14u, and a powerful tumble flow (vertical eddy flow) is formed in the cylinder bore 13. Ignition of the tumble flow allows an ideal combustion pattern with a small amount of gas.

In case of a low-port-type inlet port with a small gradient angle, a tumble plate 100 with a length of approximately 70 mm is provided along the direction of the intake air flow. In the case of the high-port inlet port 14, the length of the tumble plate 100, which is provided along the direction of the intake air, is relatively long, approximately 115 mm. The long tumble plate 100 has a larger absolute value for the expansion allowance due to the thermal expansion during the casting of the cylinder head 10, compared to that of a short tumble plate. Therefore, the thermal effect should be fully taken into account for the long tumble plate 100.

The path of inlet port 14 is significantly curved on the cylinder side. Therefore, when the position of the cylinder side edge Ta of the tumble plate 100 varies, the characteristic of the intake air flow changes, thereby significantly affecting conditions of the tumble flow generation so that the position of the cylinder side edge Ta is extremely important. On the other hand, since the position of the inlet side edge Tb is provided on the side where the intake air is divided, and also where the control valve 18 is provided, a little fluctuation in its position does not affect the characteristic of the air flow so that in general, the precise alignment of the position of the cylinder side edge Tb is not required, compared with the position of the cylinder side edge Ta.

According to a first embodiment, when the cylinder head 10 is cast, the position of the cylinder side edge Ta is set to be fixed and the position of the inlet side edge Tb is set to be relatively free so that even if the tumble plate 100 is thermally affected during the introduction of the molten metal, it can be absorbed in the side of the inlet side edge Tb.

To add the required mechanical property, a thermal treatment (such as a T6 tempering process (which is a solution treatment plus aging treatment)) is applied to the cast cylinder head 10. The thermal treatment is carried out to even the texture because sometimes a cast product contains lubricant ingredient on its surface. The thermal treatment is carried out, for example at a solution treatment temperature of 500° C. for 3 to 4 hours.

Next, the structure of the tumble plate 100 will be described.

FIG. 5A a plan view of a tumble plate 100 according to the first embodiment. FIG. 5B is a side view thereof. FIG. 5C is a cross-sectional view thereof, taken along the line 5C—5C of FIG. 5A.

The tumble plate 100 is provided in advance in a sand core 200 (see FIG. 6) for forming the inlet ports 14 of the cylinder head 10 (described later), and a cast-in insert is carried out during the casting of the cylinder head 10 thereby dividing the inlet ports 14 of the cylinder head 10 into multiple ports (upper port 14u and lower power 14d, respectively). In the description below, the sand core 200 for molding the inlet port 14 where the tumble plate 100 is provided in advance is called in short, a "port core 200".

Referring to FIGS. 5A–5C, the tumble plate 100 has a main body 101 that has a generally rectangular plate shape. The tumble plate 100 is provided over the two or more inlet ports 14 of the cylinder head 10. This main body 101 has inlet side edges Tb (equivalent to the upstream side edges) that are located on the upstream side in the intake air direction in the inlet ports 14, and a cylinder side edges Ta (equivalent to the downstream side edges) that are located on the downstream side of the intake air flow. In addition, the tumble plate 100 is formed from a portion of the main body 101. The main body 101 has two or more divider portions 102 that divide each of the inlet ports 14 into two or more ports (upper port 14*u* and lower port 14*d*); a side cast-in insert portion 103 that is formed from both edges of the main body 101, located in the direction perpendicular to the direction of the air flow and that is enclosed by molten metal during the casting of the cylinder head 10; an inner cast-in insert portion 104 that is formed from a portion between the two or more divider portions 102 of the main body 101 and that is enclosed by the molten metal during the casting of the cylinder head 10; and an inner accelerator 110 that is formed in a portion of the inner cast-in insert portion 104, and that accelerates the coagulation of the molten metal. Detail description about the acceleration of coagulation of molten metal will be given later.

A single tumble plate 100 is provided over two independent inlet ports 14 (see FIG. 4) and it divides the two inlet ports 14 into the upper port 14*u* and the lower port 14*d*, respectively. Therefore, the single tumble plate 100 is comprised of two divider portions 102 and one inner cast-in insert portion 104.

In case where a tumble plate is provided over each inlet port 14, the same number of tumble plates as that of inlet ports 14 is required so that the number of parts is relatively increased. An increase in the number of parts may become one of the causes of deteriorated productivity, such as an increase in the number of manufacturing processes, a deterioration of handling ability, and an increase in the number of items for quality checking. In contrast, according to the present embodiment, a single tumble plate 100 is provide over multiple inlet ports 14 thereby allowing the reduction of the number of tumble plates 100 that are required per cylinder head 10. Thus, through a reduction of the number of parts, productivity is increased and the quality is equalized.

Although it is possible to place a single tumble plate over three or more inlet ports 14, it is more practical to place a single tumble plate 100 over two inlet ports 14 as in the present embodiment. This is because when it is provided over three or more inlet ports 14, it requires measures to be carried against expansion not only in the lengthwise direction (direction of the intake air flow) but also in the horizontal direction (direction perpendicular to the intake air flow). In addition, other problems may arise. For example, when the tumble plate becomes too large, the tumble plate lacks rigidity so that it is easily deformed during the handling processes.

It is desirable that the material for the tumble plate 100 be made of an aluminum alloy when recyclability is taken into account.

It is desirable that the thickness of the tumble plate 100 is relatively thin so that it does not become resistant to the intake air that flows in the inlet port 14. In the case where the material of the tumble plate 100 is an aluminum alloy, it is desirable that the thickness be approximately 1.5 mm or greater by taking into account prevention of the thermal deformity during the thermal treatment of the cast cylinder head product.

The inlet side edge Tb of the above-mentioned main body 101 is provided so as to face the inlet side opening 14*a* on the wall of the cylinder head 10.

In one embodiment, the place where the inner accelerator 110 is provided is limited to a place of the inner cast-in insert portion 104. More specifically, the inner accelerator 110 is formed closely to the side of the cylinder side edge Ta of the inner cast-in insert portion 104. In one embodiment, the inner accelerator 110 has holes 111 that are formed by penetrating through the inner cast-in insert portion 104 (see FIG. 5C). In the illustrated example, the inner accelerator 110 has a plurality of holes 111, each of which has a generally circular shape. In addition to the function of accelerating the coagulation of the molten metal, the holes 111 have the function of improving the sealing performance between the inlet ports 14 and the function of improving the strength and rigidity of the cylinder head 10 because the molten metal forming the cylinder head 10 is coagulated through the holes 111.

In the present embodiment, the accelerator 110 is formed by taking into consideration contact areas with the molten metal. That is, in the case where the accelerator 110 has a plurality of through-holes as described above, the path resistance of the molten metal increases as the through-holes are smaller when the molten metal passes through the holes. Therefore, the size of the holes is determined so as to accelerate the coagulation of the molten metal as desired. Thus, the holes 111 are formed so that the resistance to the movement of the tumble plate 100 in the molten metal under the semi-coagulated condition is sufficiently increased, due to the presence of the plurality of holes 111.

The width of the inner cast-in insert portion 104 is determined by the distance between the two inlet ports 14. The diameter of each of the holes 111 provided in the inner cast-in insert portion 104 is, for example, about 5 to 8 mm. The holes 111 are not necessarily the same in diameter. Further, in order to certainly hold the inner cast-in portion 104 by the molten metal, allowance of 2 to 3 mm is provided around each of the holes 111.

It is desirable that the cross-section of the cylinder side edge Ta of the main body 101 has a generally rounded shape (see FIGS. 5B and 5C). This is because when the tumble plate 100 is thermally expanded, the stress concentration against the port core 200 from the cylinder side edge Ta can be reduced and as a result, cracking of the core on the side of the cylinder side edge Ta can be suppressed.

It may also be desirable to carry out chamfering of the inlet side edge Tb of the main body 101. This is because sometimes a machining process using a cutter is carried out on the edge of the cylinder head 10 to which the intake manifold 12 is connected during the post-processing after the casting of the cylinder head 10, and in such cases, cutting of the inlet side edge Tb of the tumble plate 100 can be carried out more smoothly and the generation of burrs during the process can be suppressed.

In addition, in the tumble plate 100 according to the first embodiment, side accelerators 120 are formed on the side cast-in insert portions 103 so that the coagulation of the molten metal is accelerated.

In one embodiment, placement of the above-mentioned side accelerators 120 are also limited to portions of the side cast-in insert portions 103. More specifically, the side accelerators 120 are provided closer to the cylinder side edge Ta of the side cast-in insert portion 103. In one embodiment, the side accelerators 120 have at least one concave portion 121 respectively that is formed on the side cast-in insert portion 103. The at least one concave portion 121 in the illustrated example has a generally triangular shape that is concave from the outer side toward the inside of the side cast-in insert portion 103. In other embodiments, side accelerators 120 may be provided with one or more holes, a convex portion or a combination concave-convex portion or a combination of a hole and at least one convex portion, at least one concave portion or at least one combination concave-convex portion as shown in FIGS. 5D–5G The portion where the inner accelerator 110 is provided on the inner cast-in insert portion 104 is also called a "coagulation accelerated portion a" and the other portions where the inner accelerator 110 is not provided are also called a "smooth portions b". Similarly, the portion where the side accelerators 120 are provided on the side cast-in insert portion 103 is also called a "coagulation accelerated portion a" and the other portions where the accelerators 120 are not provided are also called a "smooth portions b".

During the cast-in insertion process for the tumble plate 100, the strength of the sand of the sand core for forming the inlet ports 14 that hold the tumble plate 100 is relatively low and the position of the tumble plate 100 relative to the sand core for forming the inlet ports 14 is easily shifted. As a result, the position of the tumble plate 100 relative to the inlet port 14 during casting of the cylinder head 10 is also easily shifted.

Therefore, an anti-shifting means 140 that prevents displacement of the tumble plate 100 relative to the port core 200 is provided for the tumble plate 100 according to the present embodiment. The anti-shifting means 140 is provided on the cylinder side edge Ta and the inlet side edge Tb, and is comprised of steps 141 and 142 that are positioned inside the sand core. The steps 141 and 142 are formed at a predetermined angle relative to the direction of the intake air flow. The length and the inclination angle relative to the direction of the intake air flow of the steps 141 and 142 can be selected by taking into account the retention that is required for the tumble plate 100 in the port core 200 and the positional precision that is required for the tumble plate 100. In addition, the anti-shifting means 140 can be provided for only one of either the cylinder side edge Ta or inlet side edge Tb.

Although the manufacturing method of the tumble plate 100 is not particularly limited, in one embodiment, the tumble plate 100 is manufactured with press molding in view of a simple and cost-effective manufacture of the same quality product.

Figure 6A:
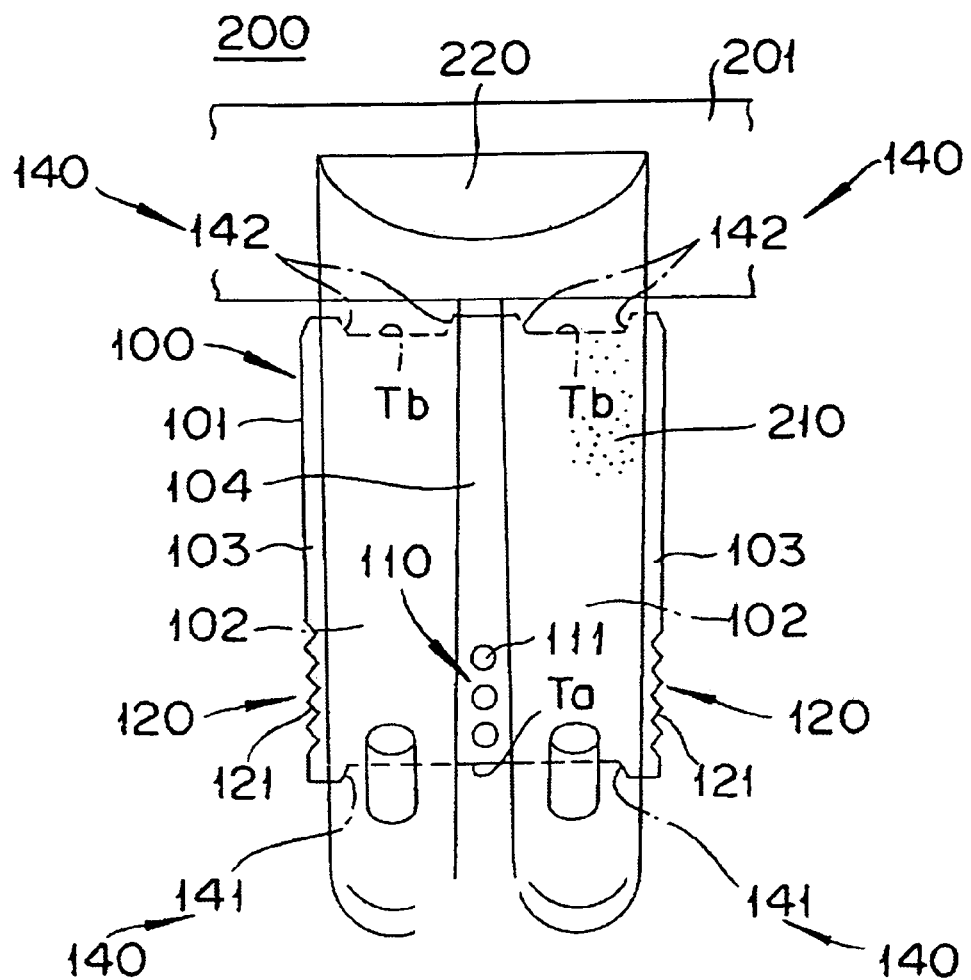
FIG. 6A is a plan view of a port core where the tumble plate according to the first embodiment is provided in advance.
Figure 6B:
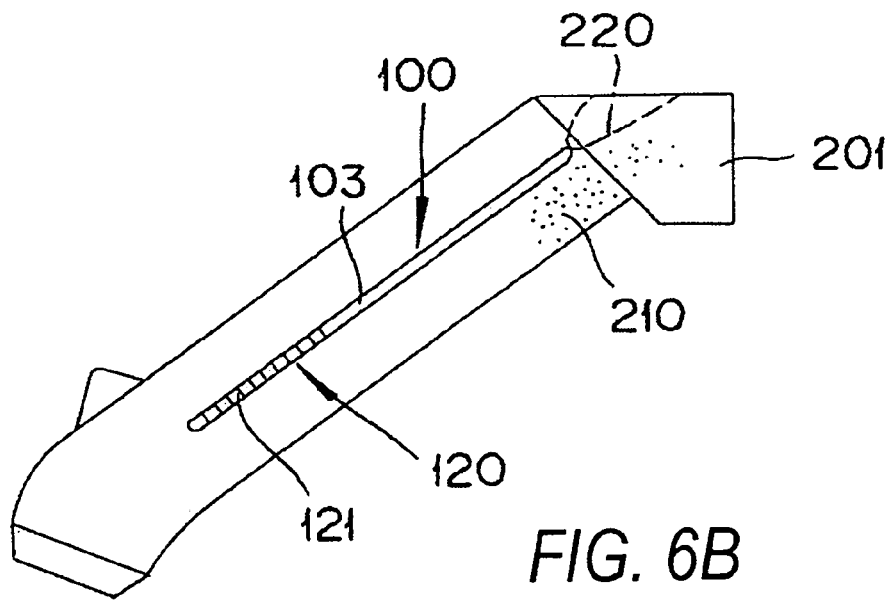
FIG. 6B is a side view of the port core of FIG. 6A.
Figure 7:
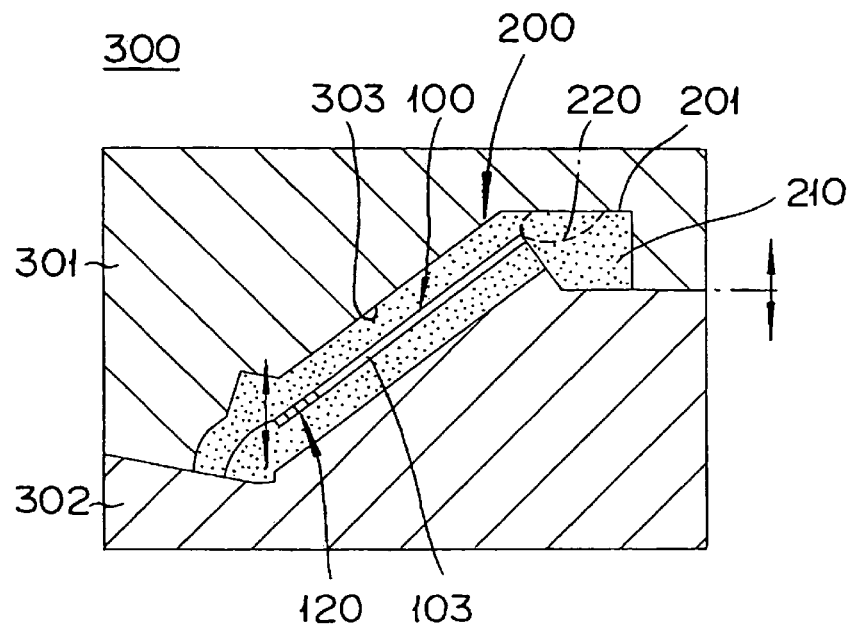
FIG. 7 is a schematic cross-sectional view of an embodiment of a mold used to create a port core.
Figure 8:
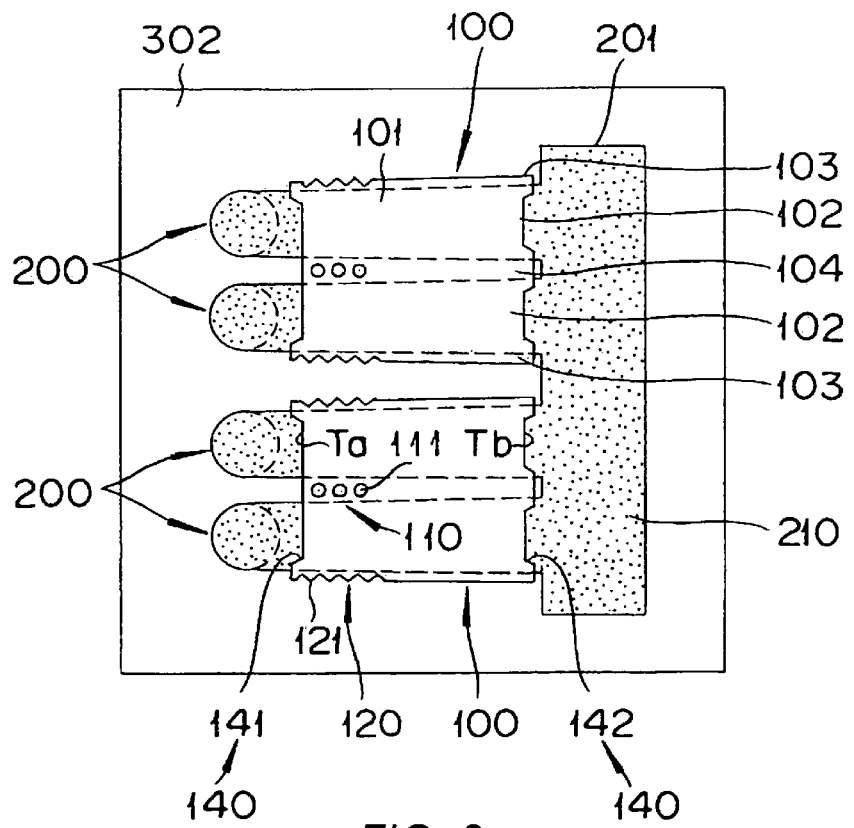
FIG. 8 is a plan view of the mold of FIG. 7 in which an upper portion of the mold for the port core is taken away and the tumble plate is exposed.

FIG. 6A is a plan view and FIG. 6B is a side view of the port core 200 where the tumble plate 100 according to the first embodiment is provided in advance. FIG. 7 is a schematic cross-sectional view showing a mold used to create the port core. FIG. 8 is a plan view of the mold of FIG. 7 in which an upper portion of the mold for the port core 200 is taken away, so that the tumble plate 100 is exposed. In the following description, the mold 300 for forming the port core 200 is called in short a "core mold 300".

During the casting of the cylinder head 10, the port core 200 shown in FIGS. 6A and 6B is molded by using the core mold 300 shown in FIG. 7.

The port core 200 is used to form the inlet ports 14 of the cylinder head 10. Specifically, the port core 200 is placed in a casting die 400 that casts the cylinder head 10 (see FIG. 9). In this port core 200, the above-mentioned tumble plate 100 is provided in advance, by positioning the divider portion 102 in the core sand 210 (see FIGS. 6A and 6B) and exposing the side cast-in insert portion 103 and the inner cast-in insert portion 104 to the outside from the core sand 210. The steps 141 and 142 are also positioned in the core sand 210.

The port core 200 has a baseboard 201 in the outside (also called the "outside of the product shape") of the area (also called the "inside of the product shape") where the inlet ports 14 are shaped. The above-mentioned inside of the product shape is easily affected by thermal deterioration because it comes in direct contact with molten metal. On the other hand, the baseboard 201 comes in less contact with the molten metal so that it receives little effect from thermal deterioration due to the binder of the core sand 210, whereby the core strength is maintained during casting compared to the above-mentioned inside of the product shape. Therefore, due to the thermal expansion of the tumble plate 100 during casting of the cylinder head 10, the port core 200 is pressed by the cylinder side edge Ta, so that sometimes a crack or breakage is generated inside the product shape. When the core is broken inside the product shape, a deburring process during the post-processing becomes extremely complicated.

Therefore, the port core 200, according to the present embodiment, has a space 220, which is formed by removing the core sand 210 in the side of the inlet side edge Tb, so that the portion which has the weakest strength in the port core 200 can be actively configured to be formed outside the product shape in a stable manner. The space 220 allows the thermal expansion of the tumble plate 100 due to heat from the molten metal and absorbs expansion of the tumble plate 100. The structure having the space 220 has the objective of releasing the internal stress in a stable manner due to the difference between thermal expansion of the tumble plate 100 and the core sand 210 to the outside of the product shape.

The side cast-in insert portion 103 and the inner cast-in insert portion 104 that are exposed to the outside are securely held by the molten metal surrounding the portions while they are inserted into the molten metal. The allowance of the side cast-in insert portion 103 may be, for example, approximately 2 mm in width, but the invention is not limited thereto. The size of the inner cast-in insert portion 104 is determined by the space between the two inlet ports 14.

In the cylinder head 10 after casting, the side cast-in insert portion 103 and the inner cast-in insert portion 104 are not fused to the cylinder head 10. This is because when they are fused, a fatigue fracture in the tumble plate 100 may result due to repeated thermal shock and vibration received when the cylinder head 10 is used as an engine. Since the tumble plate 100 is not fused to the cylinder head 10, when it is viewed from the side of cylinder head 10, the cast-in insert portion of the side cast-in insert portion 103 has a notch-like shape. Therefore, when the cast-in insert allowance of the side cast-in insert portion 103 is too large, the depth of the notch becomes large thereby causing a stress concentration at the notch portion, which consequently becomes one of the factors contributing to reduction of the structural strength of the cylinder head 10. In addition, sometimes, the thickness of the cylinder head 10 has to be partially or entirely thin to improve water jacket cooling performance or to make the cylinder head 10 lightweight. Therefore it is desirable that the cast-in insert allowance of the side cast-in insert portion 103 is as small as possible.

According to the present embodiment, by accelerating the coagulation of the molten metal by the inner accelerator 110 that is provided on the inner cast-in insert portion 104, the coagulation accelerated portion a in the inner cast-in insert portion 104 is firmly fixed. In addition, by accelerating the coagulation of the molten metal by the side accelerator 120 that is provided on the side cast-in insert portion 103, the coagulation accelerated portion a is firmly fixed so as to allow the cast-in insert allowance of the side cast-in insert portion 103 to be as small as possible to the extent that is practical. Therefore, the depth of the notch becomes small thereby suppressing generation of the stress concentration at the above-mentioned notched portion, and therefore, the structural strength of the cylinder head 10 can be increased. Furthermore it may contribute to an improvement in the cooling performance of the engine and the thickness of the cylinder head 10 is reduced so as to be light weight.

As shown in FIG. 7, the above-mentioned core mold 300 is comprised of multiple partial molds such as a core top mold 301, a core bottom mold 302, and a loose piece (not shown) for forming the space 220. When these partial molds are assembled, a cavity 303 to form the port core 200 is formed inside thereof. The core sand 210 is filled in this cavity 303 and pressed and then the port core 200 is formed.

As shown in FIG. 8, the core sand 210 is filled in the core mold 300 while the tumble plate 100 is placed in the core mold 300 in advance and then the port core 200 is formed. The tumble plate 100 is aligned so as not to shift in the core mold, and is set on a seat that is formed on the mold alignment surface of the core mold 300. In other words, the tumble plate 100 is retained in a condition in which it is placed in the circumferential cavity of the core bottom mold 302.

The port core 200 formed in the core mold 300 is removed from the core mold 300 by dividing the partial molds such as the core top mold 301, and the core bottom mold 302 in the dividing direction that is shown by arrows of FIG. 7.

The space 220 is formed in the port core 200 as described above. In addition, the steps 141 and 142 are provided so as to be located in the core sand 210. As such, the length of the inner embedding of the cylinder side edge Ta into the core sand 210, and the length of the embedding of the inlet side edge Tb to the core sand 210 can be elongated by providing the steps 141 and 142. A longer embedding length into the core sand 210 allows an increase in the retention strength of the tumble plate 100 against the port core 200, whereby the displacement of the tumble plate 100 relative to the port core 200 can be prevented. Consequently, the cast-in insert allowance of the side cast-in insert portion 103 that is projected outside from the port core 200 can be firmly secured.

Figure 9:
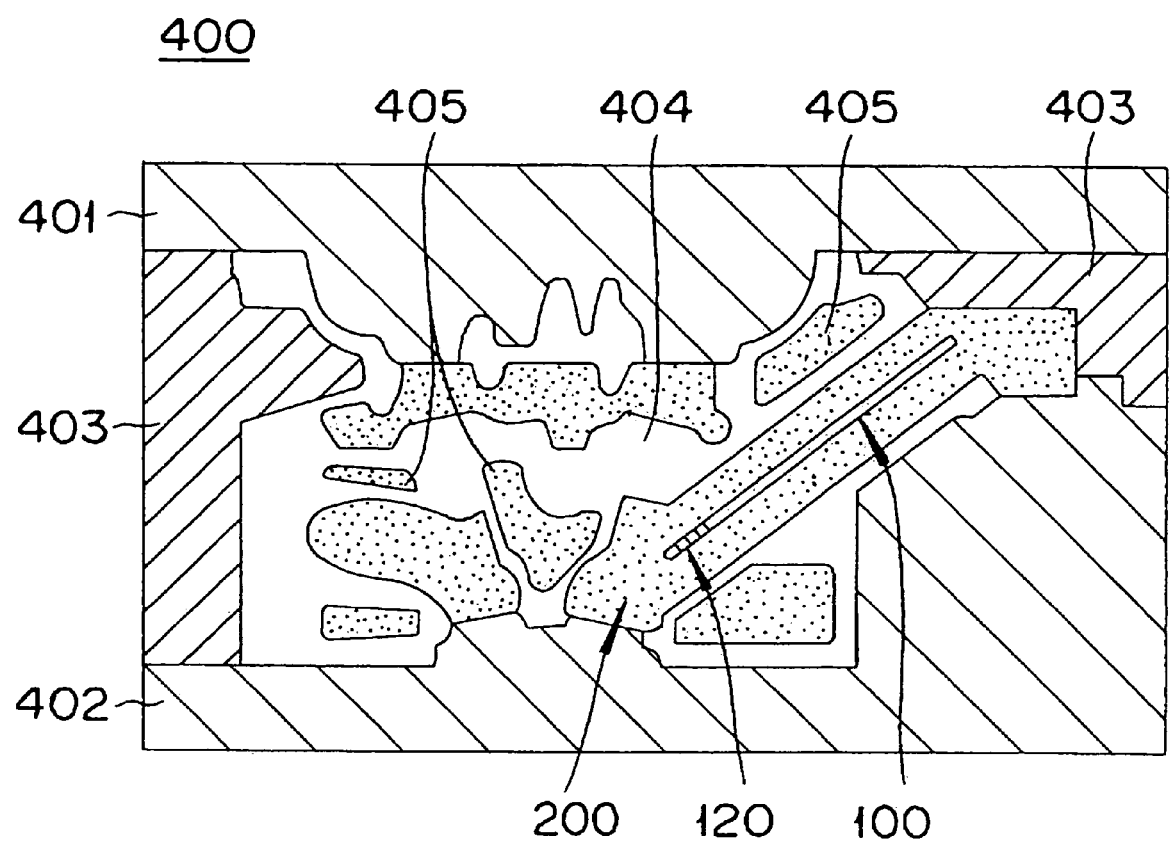
FIG. 9 is a cross-sectional view of the port core arranged in a casting die for casting a cylinder head.

FIG. 9 is a cross-sectional view showing the port core 200 arranged in a casting die 400 to cast a cylinder head 10. As shown in FIG. 9, the port core 200 is installed in the casting die 400 for forming the cylinder head 10. The casting die 400 is comprised of a top die 401, a bottom die 402 and side dies 403, and when the port core 200 is supported between the bottom die 402 and one of the side dies 403, and the top die 401 is placed on the side dies 403, whereby a cavity 404 for forming the cylinder head 10 is formed inside thereof. In the drawing, a core 405 is provided to form a water jacket. One exemplary casting method that may be employed is a low pressure die casting (LPDC) method. However, the present invention is not limited to use of LPDC.

Under these conditions, a molten metal made of an aluminum alloy and other metals are poured from the pouring gate (not shown in the drawing) into the cavity 404, and a cylinder head 10 as shown in FIG. 1 is formed. During poring of the molten metal, the tumble plate 100 that is provided in the port core 200 experiences thermal expansion due to the heat from the molten metal.

According to the present embodiment, the inner accelerator 110 having the holes 111 is provided near the cylinder side edge Ta of the inner cast-in insert portion 104. This inner accelerator 110 limits the positioning of the tumble plate 100 relative to the inlet ports 14 by accelerating the coagulation of the molten metal near a portion (coagulation accelerated portion a) where the inner accelerator 110 is provided, compared to the coagulation of the molten metal near the other portions (smooth portion b).

When the port core 200, in which the tumble plate 100 having such an inner accelerator 110 is provided in advance, is installed in the casing die 400 and the molten metal is poured into the cavity 404, the inner cast-in insert portion 104 and the side cast-in insert portion 103 of the tumble plate 100 are cast-in-inserted and then the molten metal is coagulated, so that the inner cast-in insert portion 104 and the side cast-in insert portion 103 is entirely fixed therein.

Here, the coagulation accelerated portion a of the inner cast insert portion 104 has a larger contact area per unit length with the molten metal than that of the smooth portion b, due to the presence of the holes 111. Therefore, where casting is carried out when the inner cast-in insert portion 104 is inserted therein, the molten metal near the coagulation accelerated portion a is relatively quickly chilled and the coagulation of the molten metal is accelerated compared to that near the smooth portion b. In addition, the holes 111 increase the path resistance when the molten metal passes through and therefore the molten metal near the coagulation accelerated portion a is relatively easily retained and the coagulation of the molten metal is accelerated, compared to the molten metal near the smooth portion b.

The chilling effect on the molten metal and the retaining of the molten metal at the accelerator accelerates the coagulation of the molten metal near the coagulation accelerated portion a compared to the coagulation of the molten metal near the smooth portion b. Thereby, the portion of the inner cast-in insert portion 104 that is near the cylinder side edge Ta is fixed faster than the portion near the inlet side edge Tb so that the displacement of the cylinder side edge Ta relative to the inlet ports 14 can be prevented. As described above, the position of the tumble plate 100 relative to the inlet ports 14, and in particular, the position of the cylinder side edge Ta, is limited. In addition, due to the presence of the holes 111, the resistance to the movement of the tumble plate 100 in the molten metal under the semi-coagulated condition is increased. In view of the above, the tumble plate 100 is hardly shifted and therefore the displacement of the tumble plate 100 is prevented.

Furthermore, since the coagulation of the molten metal near the coagulation accelerated portion a is accelerated, even if sand and resin film are slightly retained in the inner cast-in insert portion 104, the air-tightness is securely retained and therefore the tumble plate 100 is securely fixed. By doing so, mis-fitting of the tumble plate 100 in the product for the cylinder head 10 after the casting is completed can be significantly reduced.

Moreover, the portion of the inner cast-in insert portion 104 that is close to the cylinder side edge Ta is fixed faster than the portion close to the inlet side edge Tb, thereby allowing a limitation or controlling of the direction of the thermal expansion of the tumble plate 100 due to the heat from the molten metal to one direction, which is from the cylinder side edge Ta to the inlet side edge Tb. The thermal expansion of the tumble plate 100 is concentrated at the inlet side edge Tb, which is easily expanded, and therefore the port core 200 is not pressed by the cylinder side edge Ta. Therefore, no cracks or fractures are generated in the port core 200 in the area where it is important to form the shape of the inlet ports 14.

Even if the tumble plate 100 experiences a large thermal expansion, the port core 200 is pressed by the inlet side edge Tb, so that cracks on the port core 200 can be guided or induced to the baseboard 201 side. The burrs caused by this cracking of the port core 200 are generated outside the product shape, not inside the cylinder head 10 which is the product, after the casting is completed. Therefore, the deburring process can be easily carried out, or is not required.

Furthermore, the strength on the side of the inlet side edge Tb of the port core 200 is reduced by the space 220 compared to that of the cylinder side edge Ta. Therefore, the cracks in the port core 200 can be most surely guided or induced to the side of the inlet side edge Tb, so that the location of the burrs due to the cracks in the core can be even more limited.

According to the present embodiment, a side accelerator 120 having at least one concave portion 121 is also provided on the cylinder side edge Ta of the side cast-in insert portion 103. As with the above-mentioned inner accelerator 110, the side accelerator 120 accelerates the coagulation of the molten metal near the coagulation accelerated portion a, compared to the coagulation of the molten metal near the smooth portion b. By doing so, the portion of the side cast-in insert portion 103 near the cylinder side edge Ta is fixed faster than the portion near the inlet side edge Tb, thereby preventing the positional shifting of the cylinder side edge Ta relative to the inlet port 14. Furthermore, the direction of the thermal expansion of the divider plate 100 can be limited or controlled in one direction from the cylinder side edge Ta to the inlet side edge Tb.

In addition, displacement of the tumble plate 100 relative to the port core 200 is prevented by anti-shifting means 140 so that when the port core 200 is assembled in the casting die 400, the tumble plate 100 can be provided at the proper position on the casting die 400, which is determined based on the terms of the design, thereby limiting the position of the tumble plate 100 relative to the cylinder head 10 when the inner cast-in insert portion 104 and the side cast-in insert portion 103 are inserted, so that the tumble plate 100 can be positioned at the appropriate place in the cylinder head 10 in terms of the design.

As described above, according to the present embodiment, even though the tumble plate 100 is thermally expanded, the cylinder side edge Ta whose position is important in casting can be precisely held at an appropriate place based on the design. Therefore, position shifting and mis-fitting of the tumble plate 100 can be sufficiently limited and therefore the quality of the product is improved. Furthermore, the position of burrs due to cracks in the port core 200 is limited thereby allowing simplification of the deburring process during the post-processing.

In addition, one tumble plate 100 is provided over a multiplicity of inlet ports 14, so that the number of tumble plates 100 required per cylinder head 10 can be decreased, compared to the case in which a tumble plate is provided for each inlet port 14. Therefore, through a reduction of the number of parts, the productivity is improved thereby stabilizing the quality.

Second Embodiment

FIG. 10A is a plan view showing a tumble plate 100a according to a second embodiment. FIG. 10B is a cross-sectional view thereof, taken along the line 10B—10B of FIG. 10A. FIG. 10C is a graph that illustrates the changes in the length of the tumble plate 100a according to the second embodiment during the casting process. The structural elements that are the same as those in the first embodiment are numbered with the same numerals and their description is omitted.

The tumble plate 100a according to the second embodiment has, in addition to the structure of the tumble plate 100 according to the first embodiment, a seal forming portion 130 that forms a seal portion between the inlet ports 140. The seal forming portion 130 is provided close to the inlet side edge Tb, compared to the position where the inner accelerator 110 is provided on the inner cast-in insert portion 140.

The seal forming portion 130 has a hole 131 that is formed by penetrating through the inner cast-in insert portion 104 leaving the required size of the cast-in insert allowance. This hole 131 has a larger aperture area compared to the holes 111 of the inner accelerator 110.

While the tumble plate 100a is enclosed by molten metal during casting, the molten metal is coagulated through the hole 131 of the seal forming portion 130 between the inlet ports 14 so that the seal portion is formed. Therefore, sealing between the inlet ports 14 is improved and the strength and rigidity of the cylinder head 10 is improved.

In addition, the relatively large hole 131 is provided on the upstream side of the tumble plate 100a, thereby reducing the area that receives heat from the molten metal during the casing process, and therefore the absolute value of the expansion of the tumble plate 100a can be reduced. The reason why two or more small holes are not provided on the seal forming portion 130 is described below.

In other words, it is not only to reduce the area that receives heat, but also to limit the friction area on the inlet side edge Tb when the tumble plate 100a expands, and therefore the direction of the thermal expansion of the tumble plate 100a is limited to one direction from the cylinder side edge Ta to the inlet side edge Tb.

FIG. 10C shows the measurement results of the reduction of the expansion of the tumble plate 100a during the casting process depending on whether or not the hole 131 in the seal forming portion 130 is provided. As shown in the drawing, the hole 131 of the seal forming portion 130 reduces the amount of expansion of the tumble plate 100a. Therefore the cracks in the port insertion 200 can be limited.

Third Embodiment

Figure 11:
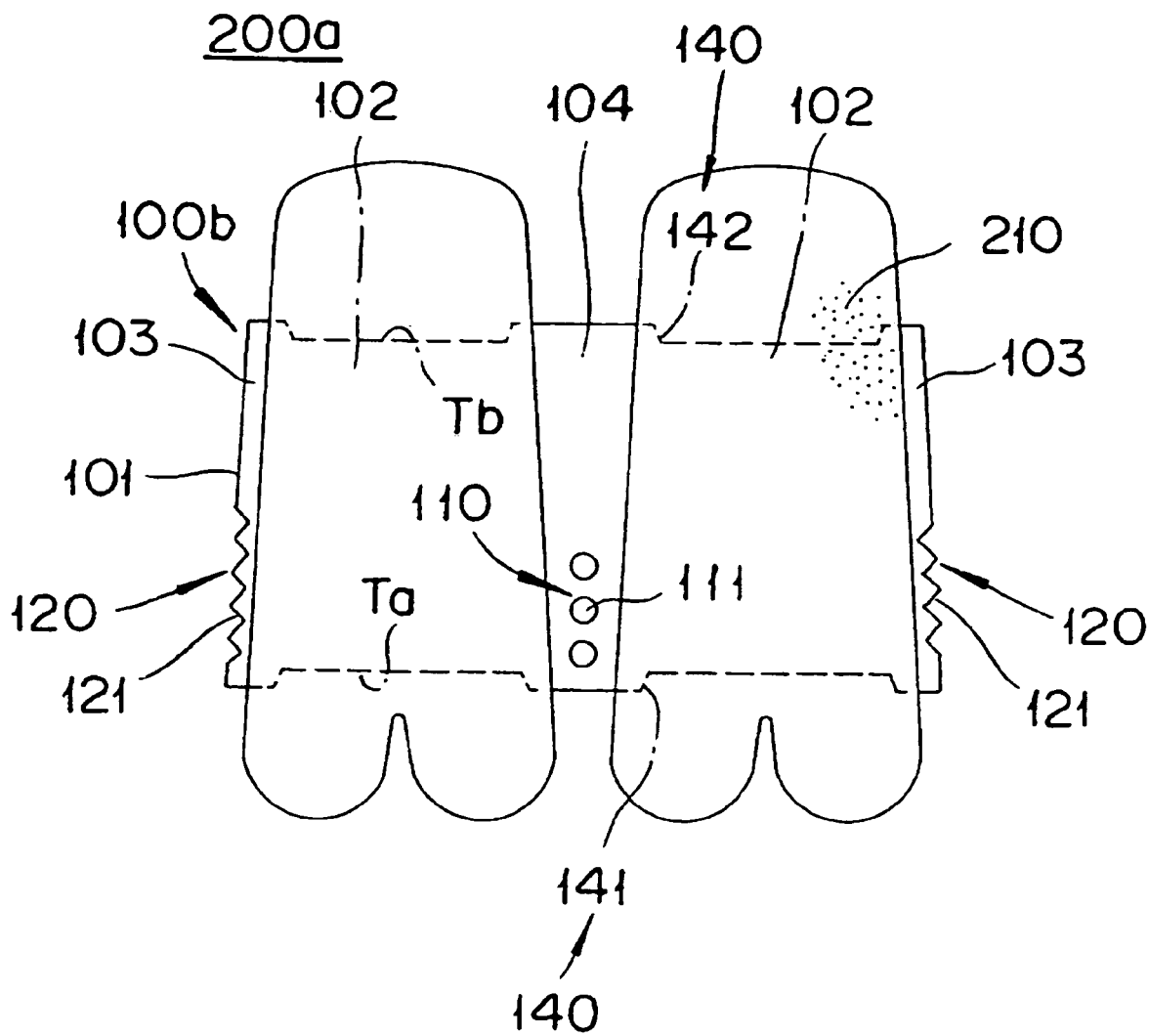
FIG. 11 is a plan view of a port core in which a tumble plate according to a third embodiment is provided in advance.

FIG. 11 is a plan view showing the port core 200 in which a tumble plate 100b according to a third embodiment is provided in advance. The structural elements that are the same as those in the first and second embodiments are numbered with the same numerals and their description is omitted.

The third embodiment is different from the first and second embodiments as the tumble plate 100 and the port core 200 that are used for the cylinder head 10 in the first and second embodiments are used with a division-type inlet port 14. In the third embodiment, the tumble plate 100b and the port core 200a are used for a cylinder head with a Siamese-type inlet port 14.

The tumble plate 100b according to the present invention has a main body 101 in a plate shape that is provided over two or more inlet ports 14. However, the type of the inlet port 14 is not limited to the division type. Indeed, the present embodiment can be applied to the Siamese-type inlet port. The Siamese-type inlet port 14 has, as described above, a path such that is singular on the side of the intake manifold 12 and diverges into two directions in front of the combustion chamber, and the number of inlet ports per one cylinder is one. Therefore, although the tumble plates 100 and 100a according to the first and second embodiments are provided over a plurality of the inlet ports 14 that are connected in the same cylinder, the tumble plate 100b is provided over a plurality of inlet ports that are connected in a different cylinder.

Other Modification Examples

Although the embodiments discussed herein show the inner accelerator 110 as having holes 111, the present embodiments is not limited thereto. An appropriate structure of the inner accelerator 110 can be employed as long as it accelerates the coagulation of the molten metal. That is, the inner accelerator 110 may have, for example, any one of the holes 111, a convex portion, a concave portion, a combination convex-concave portion, or a mix thereof, or a combination of a hole and at least one convex portion, at least one concave portion or at least one combination concave-convex portion as shown in FIGS. 5D–5G The shape and number of holes 111 is not limited. When a two or more holes 111 are formed, they can arbitrarily be formed, for example, in a scattered form, in a single line, multiple lines, or randomly. The shape of the holes 111 is not limited to a circular shape, and appropriate forms such as a triangular or semi-circular, ellipse or a rectangular shape may be employed.

A mix of different shapes is acceptable as well. A predetermined size for all holes may be employed, or, alternatively, different sizes may also be employed.

The side accelerator 120 having concave portions 121 is shown in FIG. 11. As with the above-mentioned inner accelerator 110, an appropriate structure can be employed for the side accelerator 120 as long as it accelerates the coagulation of the molten metal. The side accelerator 120 may have, for example, any one of holes 111, a convex portion, a concave portion, a combination convex-concave portion, or a mix thereof.

The preceding description has been presented only to illustrate and describe exemplary embodiments of the methods and systems of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A divider plate for two or more inlet ports provided in a cylinder head of an internal-combustion engine comprising:
    at least two divider portions that divide an interior of the two or more inlet ports along an intake air flow;
    a side cast-in insert portion provided on at least one side portion of the divider plate located in a direction perpendicular to that of the intake air flow, that is enclosed by molten metal during casting of the cylinder head;
    an inner cast-in insert portion that is provided between adjacent divider portions, that is enclosed by the molten metal during the casting of the cylinder head; and
    an inner accelerator formed in the inner cast-in insert portion, that accelerates coagulation of the molten metal,
    wherein the inner accelerator has at least one of a plurality of holes, a concave portion, a convex portion, and a concave-convex portion, or a combination of a hole and a concave portion, a convex portion or a concave-convex portion.

2. The divider plate according to claim 1, wherein the inner accelerator is provided on a downstream portion of the inner cast-in insert portion which is located downstream of the intake air flow.

3. The divider plate according to claim 1, wherein the inner cast-in insert portion has a seal forming portion at a portion other than the downstream portion.

4. The divider plate according to claim 1, wherein an inner accelerator is located downstream of the intake air flow and a seal forming portion is provided upstream of the intake air flow.

5. The divider plate according to claim 1, wherein a downstream edge of the divider plate which is located downstream of the intake air flow, has a generally cross-sectional rounded shape.

6. The divider plate according to claim 1, wherein the side cast-in insert portion has a side accelerator that accelerates coagulation of the molten metal.

7. The divider plate according to claim 6, wherein an upstream edge of the divider plate which is located upstream of the intake air flow is provided so as to face an opening on an intake air side of a wall of the cylinder head, and the side accelerator is provided on the side cast-in insert portion, downstream of the intake air flow.

8. The divider plate according to claim 6, wherein the side accelerator has at least one of a plurality of holes, a concave portion, a convex portion, and a concave-convex portion, or a combination of a hole and a concave portion, a convex portion or a concave-convex portion.

9. A sand core for forming two or more inlet ports for a cylinder head of an internal-combustion engine comprising:
    a divider plate having:
        at least two divider portions that divide an interior of the two or more inlet ports along an intake air flow;
        a side cast-in insert portion provided on at least one side portion of the divider plate located in a direction perpendicular to tat of the intake air flow, that is enclosed by molten metal during casting of the cylinder head;
        an inner cast-in insert portion that is provided between adjacent divider portions, that is enclosed by the molten metal during the casting of the cylinder head; and
        an inner accelerator formed in the inner cast-in insert portion, that accelerates coagulation of the molten metal,
        wherein the inner accelerator has at least one of a plurality of holes, a concave portion, a convex portion, and a concave-convex portion, or a combination of a hole and a concave portion, a convex portion or a concave-convex portion.

10. A cylinder head of an internal-combustion engine comprising: two or more inlet ports; and
    a divider plate that divides an interior of the two or more inlet ports along an intake air flow, including:
        at least two divider portions that divide an interior of the two or more inlet ports along an intake air flow;
        a side cast-in insert portion provided on at least one side portion located in a direction perpendicular to that of the intake air flow, that is enclosed by molten metal during casting of the cylinder head;
        an inner cast-in insert portion that is provided between adjacent divider portions, that is enclosed by the molten metal during the casting of the cylinder head; and an inner accelerator formed in the inner cast-in insert portion, that accelerates coagulation of the molten metal, wherein the inner accelerator has at least one of a plurality of holes, a concave portion, a convex portion, and a concave-convex portion, or a combination of a hole and a concave portion, a convex portion or a concave-convex portion.

11. A divider plate for at least one inlet port provided in a cylinder head of an internal-combustion engine comprising:

two or more dividing means for dividing an interior of the at least one inlet port along an intake air flow;

side cast-in insert means provided on at least one side portion of one of the two or more dividing means located in a direction perpendicular to that of the intake air flow, wherein the side cast-in insert means is enclosed by molten metal during casting of the cylinder head:

an inner cast-in insert means, provided between the two or more dividing means, that is enclosed by the molten metal during the casting of the cylinder head; and accelerator means, provided, in the inner cast-in insert means, for accelerating coagulation of the molten metal, wherein the accelerator means has at least one of a plurality of holes, a concave portion, a convex portion, and a concave-convex portion, or a combination of a hole and a concave portion, a convex portion or a concave-convex portion.

12. The divider plate according to claim 11, wherein the accelerator means is provided on the inner cast-in insert means downstream of an intake air flow.

13. The divider plate according to claim 11, further including a seal forming means, provided at a place other than that where the accelerator means is provided, wherein the seal forming means includes a passage means through which the molten metal is coagulated.

14. The divider plate according to claim 11, further including seal forming means provided on the cast-in insert means, upstream of an intake air flow.

15. The divider plate according to claim 11, wherein a downstream edge of the divider plate which is located downstream of the intake air flow, has a generally cross-sectional rounded shape.

16. The divider plate according to claim 11, further including side cast-in insert means having side accelerator means for accelerating coagulation of the molten metal.

17. The divider plate according to claim 16, wherein an upstream edge of the divider plate which is located downstream of the intake air flow, is provided so as to face an opening on the intake air side of a wall of the cylinder head, and the side accelerator means is provided on the side cast-in insert means, downstream of the intake air flow.

18. The divider plate according to claim 16, wherein the side accelerator means has at least one of a plurality of holes, a concave portion, a convex portion, and a concave-convex portion, or a combination of a hole and a concave portion, a convex portion or a concave-convex portion.

* * * * *